July 16, 1963 G. BARTOLINI SALIMBENI 3,098,198
METHOD AND APPARATUS FOR ELECTRICALLY LOGGING EARTH
FORMATIONS BY SENSING THE REDOX POTENTIAL
ARISING IN A MUD FILLED BOREHOLE
Filed March 16, 1959 2 Sheets-Sheet 1
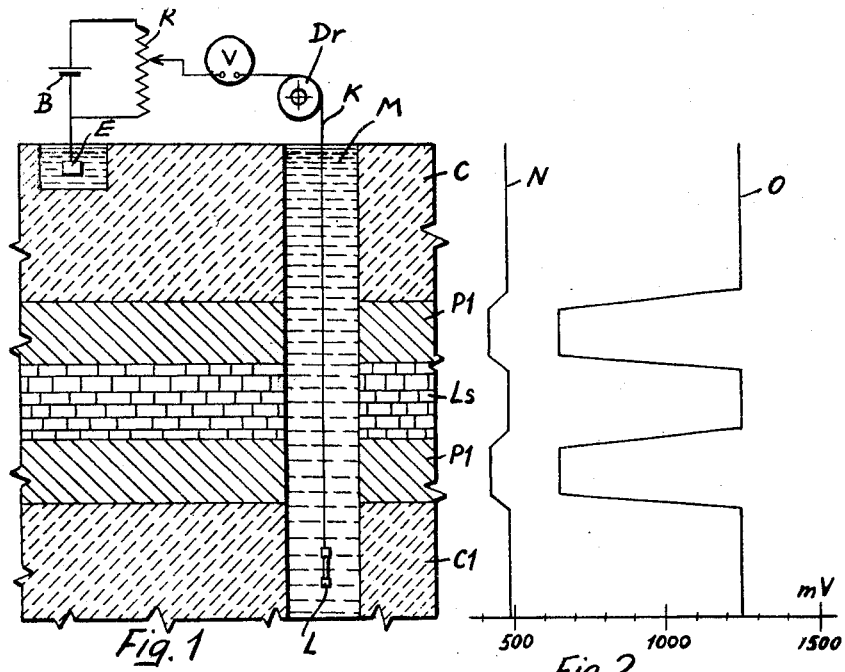
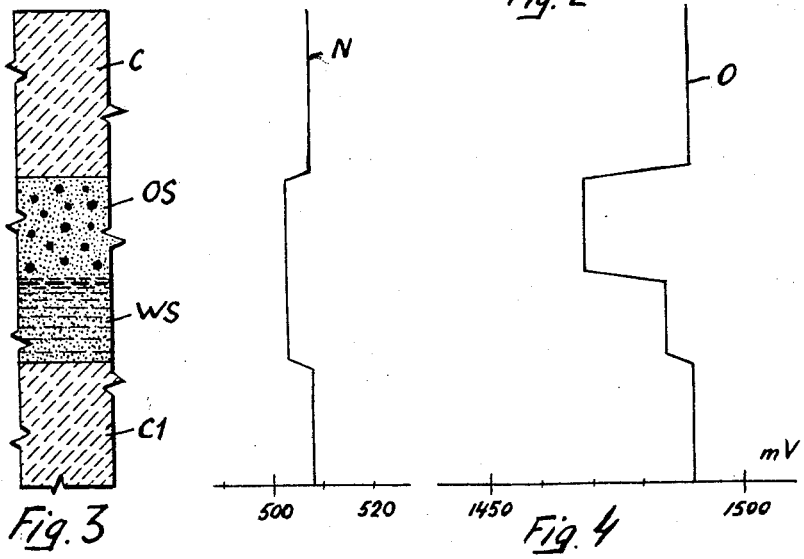
INVENTOR
GHERARDO BARTOLINI SALIMBENI
BY Toulmin & Toulmin
ATTORNEYS

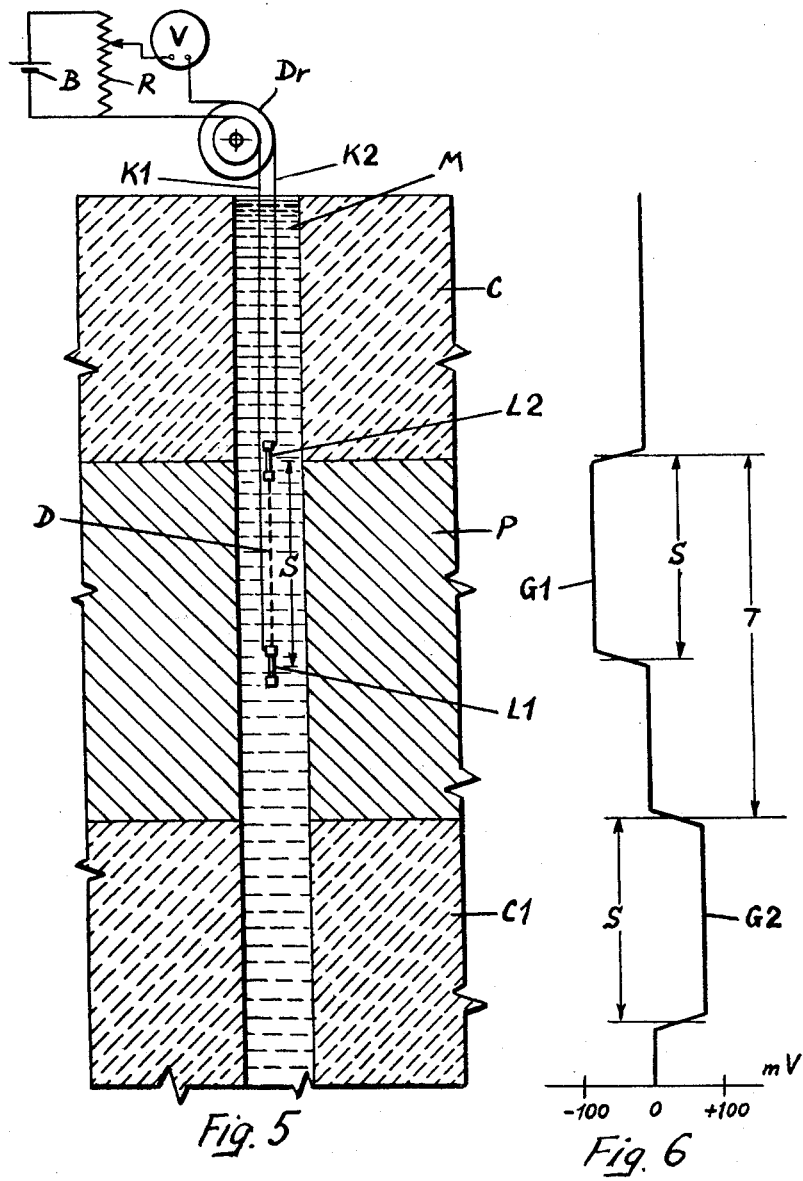

United States Patent Office 3,098,198
Registered July 16, 1963

3,098,198
METHOD AND APPARATUS FOR ELECTRICALLY LOGGING EARTH FORMATIONS BY SENSING THE REDOX POTENTIAL ARISING IN A MUD FILLED BOREHOLE
Gherardo Bartolini Salimbeni, 54 Via Pier Capponi, Florence, Italy
Filed Mar. 16, 1959, Ser. No. 799,777
Claims priority, application Italy Mar. 18, 1958
9 Claims. (Cl. 324—1)

This invention relates to electrical logging of boreholes or wells and aims to provide a very sensible method of locating subsurface formations and possibly detecting productive zones, viz. zones containing valuable minerals (this term including also mineral oils or the like), which are not easily recognizable from normal electric log dates, or need the comparison of the results of two loggings.

Another object of the invention is to provide a very simplified single-stage logging method and apparatus.

It is known that the so-called Redox (or reduction-oxidation) potential is the potential established at an inert or reversible electrode (usually a platinum electrode) dipping into a solution containing an ion or molecule in two states of oxidation.

In a redox system expressed by the formula $$\mathrm{Ox} + n\bar{e} \rightleftarrows \mathrm{Red}$$

the potential $$E = E_0 + \frac{RT}{nF} \cdot \ln \frac{[\mathrm{Ox}]}{[\mathrm{Red}]}$$

in which E is the potential measured with respect to the hydrogen electrode; $E_0$ the standard oxidation-reduction potential which is equal to the measured potential when the ions or molecules in two states of oxidation are in normal solution and in equimolecular amounts, viz. $\mathrm{Ox} = \mathrm{Red}$; R is the universal gas constant $$\left( = 8.31 \circ \frac{\mathrm{joule}}{\mathrm{C.\ gr.\ mol}} \right)$$

$n$ is the number of electrons which take part to the process of oxidation-reduction; F is the Faraday's constant and T the absolute temperature in the system, the square brackets being the symbol of the molar concentration of the substance of the redox system.

If the redox potential is higher than that of the hydrogen electrode an oxidation has taken place, and the contrary happens in case of a reduction.

Now if a solution of substances in redox equilibrium is filled in a borehole usually in form of mud when this mud comes into contact with the borehole walls these react with the substances forming said walls according to their reducing or oxidising properties. Thus the electrolytes contained in the mud undergo a modification according to the character of the strata penetrated by the borehole. Now, after said reaction has taken place, if a platinum electrode is run through the mud in the hole, the potential of this electrode will vary according to the composition of the electrolytes in the mud in correspondence of the various formations.

In my prior electric logging method according to my U.S. Patent 2,691,757 in the mud, substances were incorporated which modify the characteristics of the materials constituting the borehole walls.

The use of these modifying substances is possible, and usually advisable, also with the redox logging technique according to the invention, but, as it is apparent and will be better seen hereinafter, what it is measured in the present case is neither the conductivity or resistivity of the strata, nor the self potential thereof, but the modifications in the redoxi potentials promoted in the mud filling the various borehole sections in correspondence of the difference of reducing or oxidizing power of the corresponding wall materials, either in natural state, or suitably modified.

Thus the logging method according to the invention is first characterised by the feature that a borehole is filled with a mud containing substances in two states of oxidation and then in this hole one or more electrodes are run at least one of which, which will be called the "redox logging electrode" or "redox electrode" is sensible to the said "redox" potential variations and thus in correspondence of the different mineralogical formations or strata a number of electrical measurements is obtained, which being compared with the electrical measurements of a reference electrode, permit of delineating and detecting the mineralogical horizon of the soil traversed by the borehole.

According to the invention in order to greatly accelerate the transmission of the redox potential to the redox electrodes, "potential mediators" are employed, which are capable of rapidly transmitting to the redox logging electrode the difference of redox potentials set up in proximity of the borehole walls.

According to an embodiment of the invention, a single-stage logging method and apparatus is provided by which only the redox logging electrode is run into the borehole, while the reference electrode is located outside of the borehole.

According to another embodiment of the invention, a further method and apparatus are provided for effecting another kind of single-stage logging and which consists in running in the borehole at the same time two redox electrodes spaced apart by a short fixed distance, and in which either of the redox electrodes functions as reference electrode with respect to the other redox electrode.

Other objects and advantages will be apparent from the following specification, made with reference to the attached drawings, in which:

FIGURE 1 is a section through the sub soil formations in correspondence of a borehole and shows diagrammatically a redox logging apparatus comprising a redox logging electrode which is run into the borehole and a reference electrode, connected together through an adjustable electric bridge to a potential-measuring instrument.

FIGURE 2 shows at the left a logging curve obtained by running the redox logging electrode in a water-base mud and at the right a logging curve obtained by running the redox logging electrode in the same borehole after a provoked oxidation of the borehole walls obtained by introducing into the mud an oxidizing agent.

FIGURE 3 shows a different formation of strata of earth traversed by another borehole (not shown) and FIGURE 4 shows two logging curves before and after provoked oxidation.

FIGURE 5 shows another logging arrangement comprising a pair of vertically spaced redox logging electrodes being run into a borehole drilled through clay layers separated by a pyrite layer, and FIGURE 6 shows the redox logging curve obtained thereby.

As "redox logging electrodes" according to the invention, electrodes are preferably employed made of noble metals which are not sensitive to halide ions and preferably of platinum or of platinised platinum, i.e. solid platinum covered with spongy platinum. The shape of the electrodes must be such as to guarantee a good contact with the mud filling the borehole and at the same time to render the cleaning after each logging easy. In practice, tubular logging electrodes may be employed, or even electrodes composed of metal sheets or strips to which a wire of the same material is welded, said wire being in its turn welded to the electrical cable to which the redox logging electrode is suspended.

FIGURE 1 shows a redox logging apparatus which comprises a redox logging electrode L suspended to an insulated conductive cable K coiled on a drum Dr and the other end of which is connected to one of the terminals of a very sensitive potential-measuring instrument or millivoltmeter V. The reference electrode E, which may be a calomel electrode, or a lead electrode, is immersed in a small sump formed in the earth near the borehole and is connected to the other terminal of the said millivoltmeter V through one section of a resistor R and its movable contact, while the other section of the said resistor is connected to said electrode E through a source of electric potential B, the whole forming a kind of adjustable electric bridge.

By this arrangement, when the redox logging electrode L is run through the mud M in the borehole, to which mud a potential mediator has been added, when it passes in correspondence of some formations, such as those composed of clay C and C1 or limestone Ls, it assumes a potential which is different from that which it assumes in correspondence of the pyrites layers P and P1. Thus, by adjusting the movable contact of the resistor R so that the millivoltmeter V indicates in correspondence of the practically indifferent clay and limestone layers a potential slightly lower than 500 millivolts, it will mark in correspondence of the pyrites layers about 450 millivolts (see curve N in FIGURE 2). As potential mediator it is preferred to employ 5 p.b.w. of ceric sulphate per million of the mud, but it is possible to use any other metal salt having two different states of oxidation and passing readily from one to the other, such as ferrous sulphate.

By adding to the mud M some strong oxidizing agent, such as a chloramine, in the proportion of 1 to 3 grams for each liter of mud, as described in my prior Patent No. 2,691,757, the curve is shifted towards the higher potentials (curve O in FIGURE 2) and the peaks towards the lower potential values, in correspondence of the pyrites layers, are by far more accentuated than those of the curve N, showing a difference of the order of about 600, instead of only 50 millivolts.

The method of modifying the most exposed layers of the substances composing the borehole walls is particularly useful when two adjoining strata do not show marked differences by a redox logging without provoked alteration (usually an oxidation) of said substances. This is the case shown in FIGURE 3, in which between two clay layers C and C1 two superposed layers of oil sand OS and water sand WS are present.

By a redox logging without provoked oxidation these two strata react in like manner, so that the corresponding curve (N in FIGURE 3) shows a single low peak. If however an oxidizing agent is added to the mud in correspondence of a potential mediator, after a sufficient oxidation of the organic substances (oil) in conjunction with the borehole walls has taken place, the curve O in FIGURE 3 is obtained, which shows one stepped peak, the lower step of the peak corresponding to the water sand, whereas the higher peak indicates the position and thickness of the oil sand layer OS.

The redox logging may be effected also by running into the mud of the borehole or well a pair of redox logging electrodes L1 and L2 spaced vertically by means of an electrically insulated distance member D. One of the electrodes L1 is directly connected to one of the terminals of a potential-measuring instrument, or millivoltmeter V while the other electrode L2 is connected to the other terminal of said millivoltmeter through an adjustable resistance bridge comprising a battery B put in parallel with a resistor R provided with an adjustable contact, leading to said second terminal of the millivoltmeter.

The arrangement is such that when both redox electrodes L1 and L2 come to be in correspondence of a single formation (for example, in correspondence of a layer of clay C or of another mineral, such as pyrites P,) there is no potential gradient between the two electrodes, and the curve passes in correspondence of the zero potential, while when one of the redox logging electrodes L2 comes to be in correspondence of clay C and the other electrode L1 comes to be in correspondence of another layer, such as pyrites P, a gradient is formed for example, in the direction of the negative potential values, and the contrary happens when the redox electrode L1 comes to be in correspondence of the clay layer C1 and the other redox electrode L2 comes to be in correspondence of the pyrites layer P. From the examination of the curve reported by way of example in FIGURE 6 it is evident that the thickness T of the pyrites layer P is equal to the sum of the width S of either of the gradients or peaks C1 or C2, with the zero potential segment therebetween. The said width S corresponds to the spacing of the redox logging electrodes L1 and L2.

Of course, the redox logging method and apparatus according to the invention may undergo numerous changes, though remaining within the limits of the invention.

Thus, instead of, or in addition to, oxidizing agents other substances may be employed in order to better differentiate the various layers and have a more complete mineralogic horizon of the subsoil. Thus, in the case as shown in FIGURE 1, if instead of or in addition to an oxidizing agent a small amount of an acid is added, this will react with the limestone and substantially not with the clay or the pyrites and thus, in the curves N and O of FIGURE 2, the segment of curve in correspondence of the limestone will not be in line with the segments of curve in correspondence of the clay.

The same may be said if the minerals of a borehole react reducing reagents, such as sulphites, with alkaline reagents, such as amines, or with wetting agents which may have either an acid character, such as the sulphonic acids, or a basic character, such as the amines, or even be neutral, such as the salts of sulphonic acids and of amines.

Of course, for each case the mud must be so chosen as not to react with the oxidizing, acid or alkaline reagents. Thus, in case of employment of oxidizing reagents, the use of quebracho or other oxidizable organic material in the mud should be avoided.

From the foregoing it is apparent that a very rapid and efficient logging method has been developed by ultilising the indications of redox electrodes and, as a difference to other known electrical logging methods, including the method of the same patentee forming the object of the U.S. Patent 2,691,757, the above method permits in many cases to have in a single stage well determined indications, for which by the most prior electrical logging methods two loggings were necessary.

I claim:

1. A method of locating subsurface formations along a borehole filled with a water-base liquor and consisting in adding to the liquor a reagent which is capable of reacting with at least some of the materials of the formations surrounding the borehole and changing the electrolytical characteristics of the liquor in correspondence of said formations and running into the said borehole two vertically spaced reversible electrodes, preferably platinum electrodes, insulated from one another and measuring the differences of the redox potentials existing between said electrodes.

2. A method of locating sub-surface formations containing oxidizable or reducible minerals along a borehole filled with a water base mud or liquor which does not contain organic reducing substances, comprising the steps of adding to the mud a reagent which is capable of reacting with at least some of the materials of the formations surrounding the borehole and changing the electrolytical characteristics of the mud in correspondence with said formations, running into the borehole at least one reversible electrode, measuring at the end the redox potentials set up at said electrode with respect to a reference potential and recording the redox potential versus depth, whereby the formations containing oxidizable or reducible minerals are detected by the variations in said redox potential.

3. The method according to claim 2, wherein said reagent capable of reacting with said materials is an oxidizing reagent.

4. The method according to claim 2, wherein said reagent capable of reacting with said materials is a reducing agent.

5. A method of locating sub-surface formations containing oxidizable or reducible minerals along a borehole filled with a water base mud or liquor which does not contain organic reducing substances, comprising the steps of adding to the mud a soluble substance having two states of oxidation capable of existing in redox equilibrium and of readily passing from one state to the other and a reagent which is capable of reacting with at least some of the material of the formations surrounding the borehole and changing the electrolytical characteristics of the mud in correspondence with said formations, running into the borehole at least one reversible electrode, measuring at the end the redox potentials set up at said electrode with respect to a reference potential and recording the redox potential versus depth, whereby the formations containing oxidizable or reducible minerals are detected by the variations in said redox potential.

6. The method according to claim 5, wherein a soluble cerium salt, like cerium sulphate, is employed as potential mediator.

7. The method according to claim 5, wherein ceric sulphate at a concentration of about 5 p.b.w. per million of the mud is employed as potential mediator.

8. A logging apparatus for locating subsurface formations along a borehole filled with mud and comprising a redox logging electrode which is reversible, a flexible cable connecting said redox logging electrode to one of the terminals of a sensitive electric potential measuring instrument having at least two terminals, said redox logging electrode suspended to said cable and capable of being run into and out of said borehole for detecting the redox potentials arising in said borehole, a reference electrode of calomel inserted in a sump in the proximity of said borehole, and an adjustable resistor connecting said reference electrode to said potential measuring instrument, for logging of the borehole by adjusting said resistor and by measuring potentials indicated by said measuring instrument during the running of said redox logging electrode along said borehole.

9. A logging apparatus as claimed in claim 8, wherein said reference electrode comprises a lead electrode.

References Cited in the file of this patent

UNITED STATES PATENTS

| | | |
|---|---|---|
| 1,865,847 | Ennis | July 5, 1932 |
| 1,889,889 | Ennis | Dec. 6, 1932 |
| 1,913,293 | Schlumberger | June 6, 1933 |
| 1,994,762 | Ennis | Mar. 19, 1935 |
| 2,230,999 | Doll | Feb. 11, 1941 |
| 2,387,513 | Hocott | Oct. 23, 1945 |
| 2,442,476 | Taggart | June 1, 1948 |
| 2,526,857 | Chaney | Oct. 24, 1950 |
| 2,694,179 | Walstrom | Nov. 9, 1954 |

OTHER REFERENCES

Geophysical Exploration, by Heil and Prentice-Hall, New York, 1940, pages 628–631.